United States Patent [19]

Higbee

[11] 4,447,018

[45] May 8, 1984

[54] TOGGLE TYPE WEB LOCK

[75] Inventor: Wallace C. Higbee, Romeo, Mich.

[73] Assignee: The Firestone Tire & Rubber Company, Akron, Ohio

[21] Appl. No.: 352,899

[22] Filed: Feb. 26, 1982

[51] Int. Cl.³ .................. A44G 11/06; A62B 35/00; F16D 59/02

[52] U.S. Cl. .................. 242/107.2; 24/170; 188/65.4; 188/188

[58] Field of Search .......... 24/230 R, 263 SB, 263 R, 24/263 SW, 136, 168, 170; 188/65.1, 67, 65.4, 188; 242/107.2; 280/806, 808; 297/478, 479, 480

[56] References Cited

U.S. PATENT DOCUMENTS

| | | | |
|---|---|---|---|
| 2,537,307 | 1/1951 | Griswold | 24/170 |
| 3,389,873 | 6/1968 | Filippi et al. | 242/107.2 |
| 3,669,223 | 6/1972 | Arnold | 188/65.4 X |
| 3,817,473 | 6/1974 | Board et al. | 242/107.2 |
| 3,834,496 | 9/1974 | Takada | 242/107.2 |
| 3,911,535 | 10/1975 | Mauron | 297/478 X |
| 4,120,466 | 10/1978 | Adomeit | 242/107.2 |
| 4,128,261 | 12/1978 | Paitula | 280/744 |
| 4,206,886 | 6/1980 | Yoshitsugu | 242/107.2 |
| 4,208,770 | 6/1980 | Takada | 24/136 K |
| 4,211,377 | 7/1980 | Yasumatsu | 242/107.2 |
| 4,243,185 | 1/1981 | Motonami | 242/107.2 |

Primary Examiner—Stuart S. Levy
Assistant Examiner—Lloyd D. Doigan
Attorney, Agent, or Firm—Miller, Morriss & Pappas

[57] ABSTRACT

A toggle type web lock using articulated bars in a channel frame to close on webbing with a force dependent upon tension in the webbing. The web lock is variably located in safety belt harness systems and is of greatest utility in prevention of webbing elongation in long runs of safety belt webbing.

1 Claim, 4 Drawing Figures

TOGGLE TYPE WEB LOCK

The present invention is a toggle type webbing clamp useful in gripping, braking and holding belt webbing such as the webbing employed in safety belt restraint systems of the automotive and aircraft type. Webbing clamps have been generally frowned upon as a means of restraining web belts in automotive usage but as lengths of webbing increase and the safety requirements seek for increased gripping power without shearing or slipping, the technology has sought for devices which seize or close on the webbing (usually intermediate its anchor or lock points) in a form of frictional retention or restraint. Not unusually such structures are supplemental or auxiliary to reel pawl stop means and are positioned remote therefrom in prevention of webbing stretch or elongation under stress. Most of such devices used in the automotive applications require movement of the webbing through a tortuous path, exceeding or approaching 90 degrees. The tortuous path requires more webbing and increases the length of webbing and hence possible elongation.

Characteristic of such devices are the structures of Hannu O. Paitula in U.S. Pat. No. 4,128,261, in the U.S. Pat. Nos. 4,120,466 and 4,181,273 to Heinz-Dieter Adomeit, in the U.S. Pat. Nos. 4,206,886, 4,211,377 and 4,243,185 to Jun Yasumatsu and others. Earlier examples of cam clamping of webbing for seat belt buckles is appreciated in the U.S. Pat. No. 2,537,307 of Owen H. Griswold. In retractors, a webbing clamp lock is provided in the U.S. Pat. No. 3,817,473 of Richard G. Board and Nelson F. Shapiro. A belt clamp for a vehicle passenger restraint belt system independent of a retractor or buckle is shown in U.S. Pat. No. 4,208,770 to Juiiro Takada and which involves a reversal of webbing flow direction.

Insofar as applicant is aware, there is no suggestion in the prior art of the use of a toggle type clamp for achieving the gripping, braking and holding of belt webbing between a pair of parallel blocks which move simultaneously against each other upon the upset of a bias holding the blocks apart and that the gripping strength after initiation of closure is a function of the subsequent force tending to pull the webbing through the movable blocks. The passage through the blocks is in a plane parallel to and between the working faces of the blocks. Slightly deformable inserts provide the working faces of the block and locally deform to imbed the insert material in the weave or fabric of the belt or webbing at a compression proportional to the ultimate pull developed against the clamping and thus establish an area grip on the belting in avoidance of shear or slip.

The structure of the present invention is intended to provide a webbing clamp structure which assures a resistance to shear, slip, or failure in the clamp between clamp element and storage or retractor structure. This is achieved in such a manner as to provide a blocking structure which is locatable anywhere in a harness structure where the frame of the clamp unit can be anchored. In this manner the effect of elongation, and cumulative elongation of webbing can be minimized and no added webbing is required since the movement of the webbing through the unit is essentially straight-line movement. When the tension on the webbing is relaxed, the clamp is restored to its open position allowing full movement of webbing therethrough.

As will be seen, the activation of the clamp of the present invention requires minimum energy once the established set bias is exceeded. In this manner the device operates only when forces in excess of the selected set point of the open bias are achieved.

Thus, the principal object is to provide a new, improved, useful and inventive toggle type clamp.

Another object is to close the clamp effectively where the blocks are cammed together and the engagement of block to belt webbing increases the clamping force in accord with applied stress as tension is applied to the webbing belt and the locking stresses are transmitted into the frame and via the frames are translated into the vehicle, automobile, boat, or structure.

In addition, the actuation of the toggle clamp of the present invention is by means of any upset of the established open bias in the toggle structure and this is achievable by pendulum lever displacement by solenoid displacement, or by any other means such as by mechanical effort through the webbing in contact movement of the blocks.

Other objects including simplicity, economy and the provision of a straight-through toggle webbing clamp and a structure usable at any point in a webbing harness structure where the frame of the claimed structure can be secured to vehicle structure, will be appreciated as the description proceeds.

GENERAL DESCRIPTION

In general, the structure of the present invention is relatively simple and includes a support frame. Plural pivot bars transverse of the support frame are provided and they are pivotally supported by the frame. Preferably, the bars form a toggle pivotal on its edges against the frame support and the bars pivot against at least one of the clamp blocks of the present invention so that as pivoting occurs the clamping action is initiated. The clamping is essentially a camming motion directed against a corresponding parallel clamp surface which may be stationary or movable. As will be seen, a spring bias opposes the clamping action. A pair of clamp blocks are toggle supported in opposed spaced-apart parallel registry with each other and are coordinatively moved in accord with motion from the pivot bars toward and away from each other. Guide arms of links coordinate at least one pair of the pivot bars whereby movement in one set of bars is assured in all bars. A selected spring bias is applied to the structure to normally hold the bars in spaced open relation to each other whereby a belt or webbing is freely movable between the clamp blocks. A means to overcome the selected spring bias is applied whereby the clamp blocks are moved toward closure against each other and toward closure against the intermediate webbing or belt. Thereupon, the fractional engagement of stressed webbing to the blocks moves the blocks to closure against each other and with tilting of the pivot bars supported in the frames with increasing gripping in accord with applied tension and consequent force. Accordingly, the closing force need only exceed the bias to open. Tension is the web belting achieves the final lock.

Pockets or depressions are provided in the work faces of the clamp blocks into which brake shoe inserts are placed. The materials selected for the brake shoe inserts are preferably slightly deformable but with excellent memory characteristics so that after deformation in use, the original form is restored. One such excellent material is formed polyurethane. A lever such as a vehicle sensitive pendulum or other inertially responsive means is useful in closing displacement of the toggle linkage formed by the tilting bars which collectively pivot in the frame supports from a full open position urged by the normal bias against the clamp blocks to a frictional closing position against intermediate webbing.

The simplicity and operation of the toggle clamp of the present invention is best understood by reference to the drawings.

In the drawings

SPECIFIC DESCRIPTION

Figure 1:
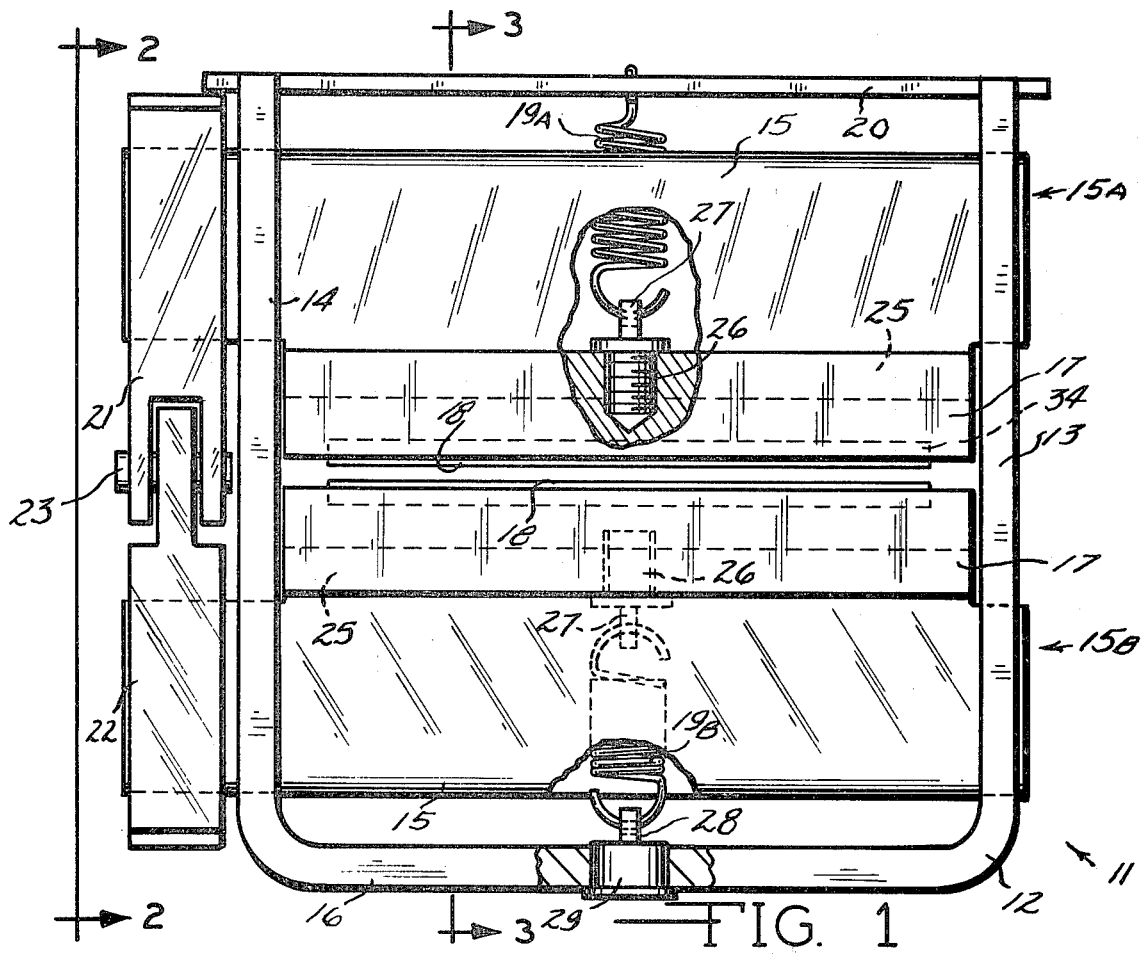
FIG. 1 is a front elevation view of a toggle type device in accord with the present invention looking through the support frame and through the gap between the clamp blocks. The FIG. 1 is partially cut away to reveal the spring bias between the frame and the clamp blocks urging the blocks on their tilt bars to the open position shown.

The toggle clamp 11 of the present invention includes a U-shaped integral support frame 12. The channel form shape of the frame 12 allows the upstanding legs 13 and 14 to operably support the transversely supported pivot or toggle bars 15 at support windows, as will be seen. The web portion or base 16 of the frame 12 provides structural support for the legs 13 and 14 and provides convenient mounting means so that the toggle clamp 11 can be conveniently attached to vehicle structure as desired and so that safety belt webbing can be passed between the pivot or toggle bars 15 and between the flanking legs 13 and 14. Actually, the webbing passes between the upper bank of bars 15A and the lower bank of bars 15B. Clamp blocks 17 are poised on the juxtaposed edges of the bars 15 on the banks 15A and 15B. One or more gripper shoes or inserts 18 are seated in each of the juxtaposed clamp blocks 17 and preferably in wells or sinks, as shown, so that as the blocks 17 close toward each other their contact against webbing is by means of the relatively resilient in slightly deformable faces of the inserts 18 on each side of the webbing. This will be better understood as the description proceeds.

Figure 2:
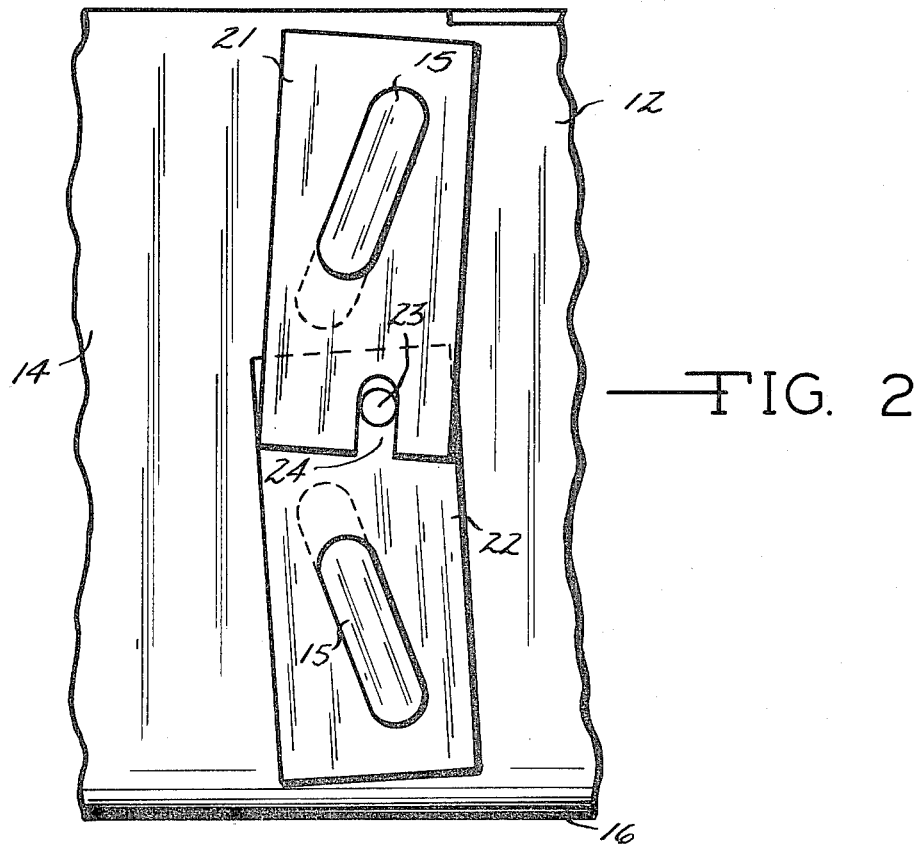
FIG. 2 is a partially cut away side elevation view taken on the line 2—2 of FIG. 1 and indicating the guide arms functioning to coordinate pivotal movement of opposed pairs of bars and hence the entire toggle system.

In the FIG. 1 a bias to open position is applied to the blocks 17 by means of the springs 19A (upper as shown) and 19B (lower as shown). The tension springs 19A and 19B are attached to the blocks 17 and, respectively, to the spacer or separator strut 20 spanning between the legs 13 and 14 and to the web or base 16 of the frame 12. At one end the toggle or pivot bars 15 extend through the leg 14 of the frame 12 and are cradled in coordinating fitted arms or links 21 and 22. The links 21 and 22 are articulated for movement by means of a pin 23 provided through one of the links 22 and extending into the slot 24 (FIG. 2) of link 21. In this toggle construction, movement of any bar 15 causes coordinating movement in all bars 15 in the upper and lower bar banks 15A and 15B. This occurs since the clamping blocks 17 are grooved and the grooves 25, in spaced-apart relation on the backs of the clamp blocks 17, maintain the coordinated pattern of movement in bars 15 so that the blocks 17 close toward and away from each other pressing their inserts 18 against any intermediate webbing when the bars 15 are tilted in one direction and they separate from each other and away from the webbing as the bars 15 are tilted in an opposite direction. Thus, as can be seen in the FIG. 2 as the bars 15 move, the links 21 and 22 move with them. Links 21 and 22 need serve only a single bar 15 in the upper bank 15A and a corresponding bar 15 in the lower bank 15B for the reasons indicated. In the FIG. 1 threaded plugs 26 in the blocks 17 provide eyes 27 for connection to the springs 19A and 19B. An eye 28 in the web or base 16 of the frame 12 is located in the form of a flanged plug 29 to achieve connection to one end of the spring 19B, as shown.

Figure 3:
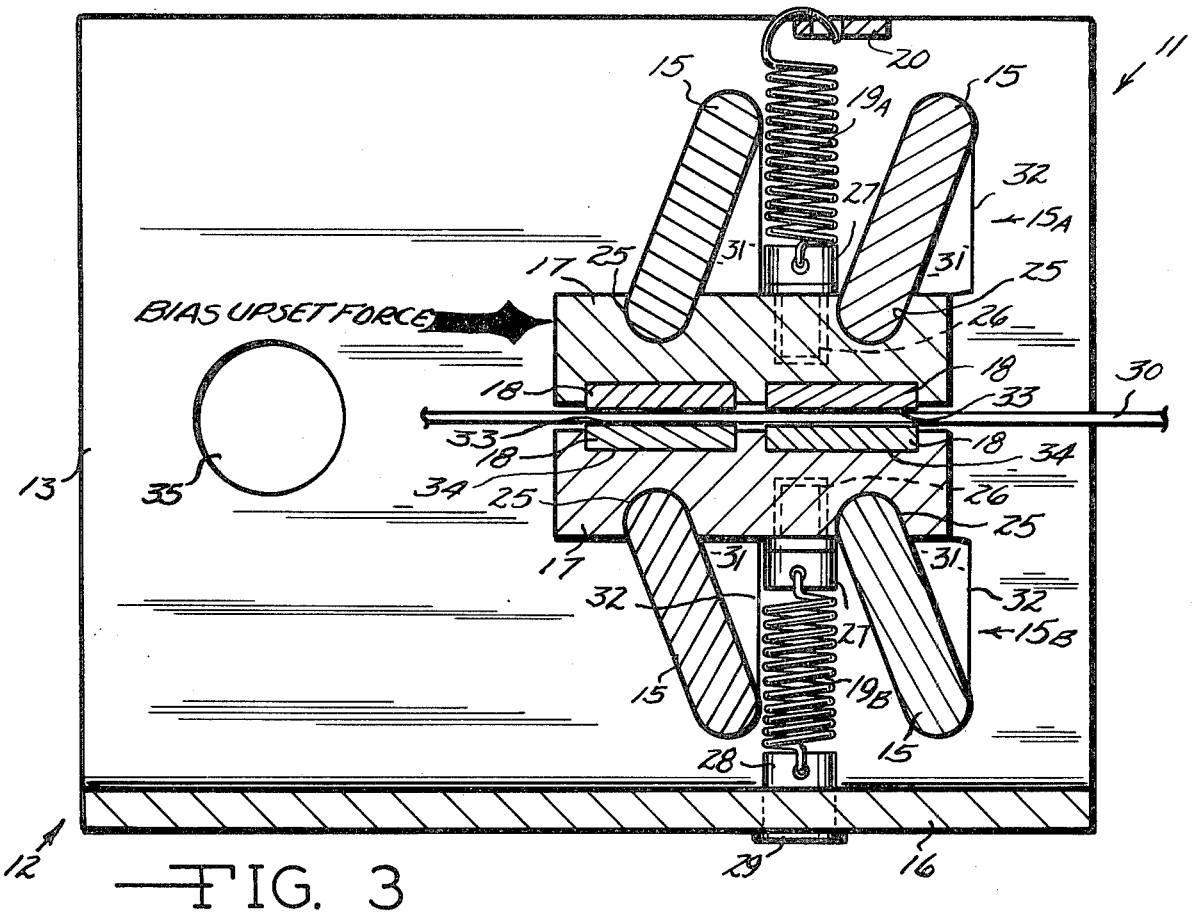
FIG. 3 is a cross section side elevation view of the structure of the present invention taken on the line 3—3 of FIG. 1 and showing a piece of belt or webbing passing straight through the clamp blocks and the frame. The clamp blocks are biased to the open position.

FIG. 3 permits one to visualize the positioning of the webbing 30 as it passes between the resilient shoes or inserts 18 supported in the clamp blocks 17. The toggle bars 15 poised in upper and lower banks 15A and 15B, respectively, are seen biased in one direction (to left as drawing is read) by the springs 19A and 19B to the open position as the clamping blocks 17 are urged to separate. As biased to full-open, the bars 15 rest in arcuate butterfly wing openings or windows 31 in the open extreme (non-vertical as seen in the FIG. 3) position. The bars 15 are retained against longitudinal displacement by shouldering against the legs 13 and 14 in all positions but one for ease of assembly and disassembly. When the bars 15 tilt toward the vertical wall 32 in the wing openings 31, then the clamp blocks close upon each other in a compound parallelogram movement which assures a gripping of the shoes or inserts 18 against the webbing 30. If the webbing 30 is under tension at the time of frictional engagement with the webbing 30, the holding pressure is increased and if the tension in the webbing 30 is relaxed, then the springs 19A and 19B retract the blocks 17 from the webbing 30 and freeing the webbing 30 from grip by the inserts 18.

As will be appreciated, the inserts or shoes 18 may have toothed or serrated web engaging faces 33 modifying the feel or resilience of the material forming the shoes 18 and selectively resisting outward or withdrawal movement of the webbing 30 while enhancing release of the webbing 30 as retraction of the clamp blocks 17 and webbing 30 occurs. The particular material of the shoes 18 should be especially selected for toughness, abrasion resistance, and good memory with sufficient resilience to deform to the weave or texture of the webbing 30. The preferred material is a polyurethane molded and sized shoe adhered to the metal clamp blocks 17 in the wells, depressions or sinks 34 thereof. In this manner the shoes 18 achieve a grip which might be classed as approaching integrity with the webbing 30 and across a substantial area. Because of the maintained parallelity between the blocks 17, the surface area of gripping may be extended as desired, but the plural inserts 18, as shown, are preferred. The opening 35 in the leg 13 shows one means of mounting the frame 12 to a structural part of a vehicle in some convenient location in the selected pathway of the webbing 30. The base 16 and the leg 14 also provide convenient mounting plates for the toggle clamp 11 when desired. As will also be appreciated, the tension in springs 19A and 19B may be selected in accord with particular usage.

Actuation of the closure of the toggle clamp 11 requires only the overcoming of the bias to the open position. Any upset of the bias, as by frictional engagement of the webbing 30 with the shoes 18 during withdrawal and any movement (for example, inertial) of the blocks 17 against the bias results in locking of the shoes 18 against the webbing 30 and when there is withdrawal tension in the webbing 30 the force of the clamping is magnified. The Force Arrow designated "BIAS UPSET FORCE" in the FIG. 3 causes closure by rocking of the coordinated toggle banks 15A and 15B on the bars 15. If there is any tension then in the webbing 30, the clamping is effective at a range determined by the engagement area and the tension. This provides an excellent and flexibly located supplemental lock and in minimization of webbing elongation between lock positions. As will be appreciated, by merely deviating the plane of movement of the webbing through the shoes 18 so as to result in drag against the shoes 18, locking may occur. The webbing clamp 11 for safety belting is believed to provide a full range of operable utility through many supplemental positions in vehicles. In particular, such structures are extremely useful in long runs of webbing as found in passive restraints and the like. Where the blocks 17 are in planes parallel to the driving direction of a vehicle, the inertial consequence at sudden braking or upon impact allows the blocks 17 to overcome the bias 19A and 19B and close the gripper shoes or inserts 18 against the webbing 30. Where such mounting is not feasible, then translated mechanical force applied to the blocks 17 will achieve clamping.

Figure 4:
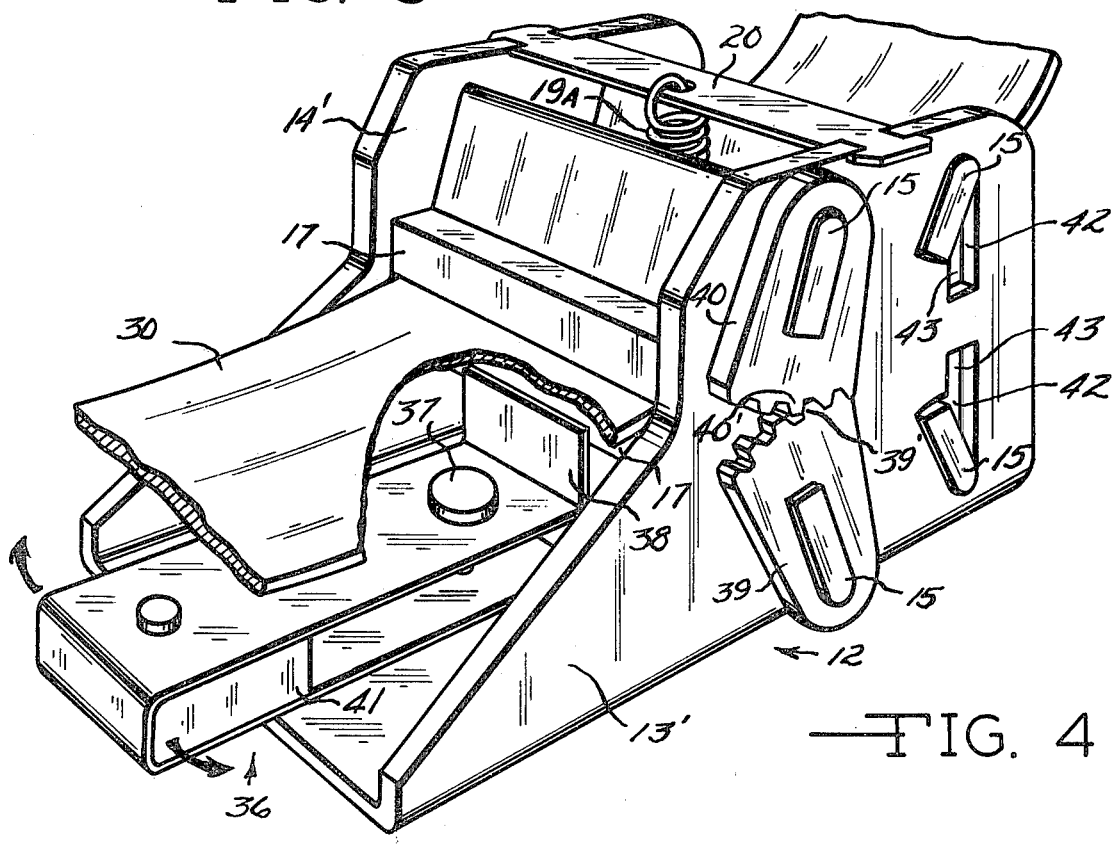
FIG. 4 is a perspective view of a modified version of the invention shown in FIGS. 1-3 and with the webbing partially cut away to show a pendulum supported by the frame positioned to engage the clamp blocks against the normal bias of the positioning springs and to displace the clamp blocks toward engagement with the belt or webbing as the pendulum is displaced.

In FIG. 4 a modified embodiment of the structure of FIG. 3 is shown and indicating that a pendulum 36 on the pivot 37 with flange 38 engageable against one of the clamp blocks 17 causes coordinated movement of the bars 15 via the geared segment articulation in gear links 39 and 40 with teeth 39′ and 40′ meshed, as shown. Displacement of the pendulum 36 carrying selected weight 41 closes the inserts 18 against the webbing 30 and the tension in the webbing 30 enhances the locking force. Spring 19A is visible connected to the strut 20. The arcuate windows 42 journalling the bars 15 are seen to include assembly relief opening portions 43 and act to retain the bars 15 from chance axial displacement. The channel-form frame 12 is modified by relieving the legs 13′ and 14′ for selected mounting in avoidance of mounting interference with adjacent structure, and as will be appreciated, webbing flow directing bars or rollers may be arranged transversely between the legs 13′ and 14′ to guide the webbing 30 in its selected course in vehicular safety belt installations.

Having thus described the invention and at least a preferred embodiment thereof, the advantages in miniaturization, flexible installation and selected holding strength with construction and maintenance economy will be further appreciated by those skilled in the art of safety belt hardware. Upon examining the present invention, those skilled in the art will perceive changes, modifications, improvements and adaptations of the present invention and such changes, modifications, improvements and adaptations are intended to be embraced in the foregoing description limited only by the scope of the hereinafter appended claims.

I claim:

1. In a toggle type seat belt webbing lock structure, the combination comprising:

a channel shaped frame having upstanding parallel spaced-apart legs and the legs thereof defining plural pairs of aligned and juxtaposed butterfly shaped openings;

a spreader bar intermediate said legs;

a pivot bar in each of said butterfly slots and transversely across said channel shaped frame;

a pair of juxtaposed clamp blocks in spaced-apart parallel relation between said legs of said frame, each having spaced-apart grooves forming outer pockets for operative engagement with edges of said extending pivot bars and said clamp blocks having registering depressions in the facing portions thereof;

inserts of slightly deformable material with excellent memory characteristics, each retained in said depressions in said clamp blocks and having work faces projecting outwardly toward a registering and facing insert;

a spring bias connected to each of said clamp blocks and urging them away from each other and limited by said butterfly openings;

guide links coordinating movement of all of said bars and operably connected over at least a pair of the ends of said pivot bars;

means selectively actuatable in a motion generally parallel to a plane between said clamp blocks, said motion displacing said clamp blocks and closing said blocks toward each other on said guide links; and a web belt movable between said blocks in a plane parallel generally to the actuatable means and engaged by said inserts as said clamp blocks close toward each other, the direction of pull thereafter urging a tighter grip by said inserts on said web belting.

* * * * *